United States Patent
Joshi et al.

(10) Patent No.: US 9,892,756 B2
(45) Date of Patent: *Feb. 13, 2018

(54) DETECTION OF LOGICAL CORRUPTION IN PERSISTENT STORAGE AND AUTOMATIC RECOVERY THEREFROM

(71) Applicant: ORACLE INTERNATIONAL CORPORATION, Redwood Shores, CA (US)

(72) Inventors: Sameer Joshi, San Jose, CA (US); Prasad Bagal, San Jose, CA (US); Rajiv Wickremesinghe, Belmont, CA (US); Richard Long, Palo Alto, CA (US); Harish Nandyala, Fremont, CA (US); Shie-rei Huang, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/886,602

(22) Filed: Oct. 19, 2015

(65) Prior Publication Data
US 2016/0042762 A1    Feb. 11, 2016

Related U.S. Application Data

(63) Continuation of application No. 14/276,914, filed on May 13, 2014, now Pat. No. 9,208,038, which is a
(Continued)

(51) Int. Cl.
*G06F 11/00* (2006.01)
*G11B 20/18* (2006.01)
(Continued)

(52) U.S. Cl.
CPC ........ *G11B 20/1816* (2013.01); *G06F 11/008* (2013.01); *G06F 11/2058* (2013.01);
(Continued)

(58) Field of Classification Search
CPC ............ G06F 2201/86; G06F 11/2064; G06F 11/008; G06F 11/3466; G06F 11/2056; G06F 11/2028
See application file for complete search history.

(56) References Cited

U.S. PATENT DOCUMENTS

| 6,629,273 B1 | 9/2003 | Patterson |
| 7,694,170 B2 | 4/2010 | Callaway |

(Continued)

OTHER PUBLICATIONS

Non-Final Office Action dated Aug. 1, 2013, for U.S. Pat. No. 8,732,521, 6 pages.
(Continued)

*Primary Examiner* — Charles Ehne
(74) *Attorney, Agent, or Firm* — Vista IP Law Group, LLP

(57) ABSTRACT

A method, system, and computer program product for restoring blocks of data stored at a corrupted data site using two or more mirror sites. The method commences by receiving a trigger event from a component within an application server environment where the trigger event indicates detection of a corrupted data site. The trigger is classified into at least one of a plurality of trigger event types, which trigger event type signals further processing for retrieving from at least two mirror sites, a first stored data block and a second stored data block corresponding to the same logical block identifier from the first mirror site. The retrieved blocks are compared to determine a match value, and when the match value is greater than a confidence threshold, then writing good data to the corrupted data site before performing consistency checks on blocks in physical or logical proximity to the corrupted data site.

20 Claims, 14 Drawing Sheets

Related U.S. Application Data continuation of application No. 13/223,221, filed on Aug. 31, 2011, now Pat. No. 8,732,521.

(51) Int. Cl.
*G06F 11/34* (2006.01)
*G06F 11/20* (2006.01)

(52) U.S. Cl.
CPC ...... *G06F 11/2064* (2013.01); *G06F 11/2082* (2013.01); *G06F 11/3466* (2013.01); *G11B 20/1883* (2013.01); *G06F 2201/81* (2013.01)

(56) References Cited

U.S. PATENT DOCUMENTS

| | | | |
|---|---|---|---|
| 7,921,267 B1* | 4/2011 | Yadav | G06F 11/2082 711/162 |
| 8,145,941 B2 | 3/2012 | Jacobson | |
| 8,176,186 B2 | 5/2012 | McCanne | |
| 2003/0167439 A1 | 9/2003 | Talagala et al. | |
| 2006/0070017 A1 | 3/2006 | Hayashi | |
| 2009/0006792 A1* | 1/2009 | Federwisch | G06F 17/30067 711/162 |
| 2011/0225346 A1 | 9/2011 | Goss et al. | |
| 2013/0055018 A1* | 2/2013 | Joshi | G06F 11/2058 714/19 |

OTHER PUBLICATIONS

Notice of Allowance and Fees due dated Jan. 10, 2014, for U.S. Pat. No. 8,732,521, 5 pages.
Notice of Allowance for U.S. Appl. No. 14/276,914, dated Jul. 17, 2015, 8 pages.
Third-Party Submission under 37 CFR 1.290 filed on Sep. 9, 2014, for related U.S. Appl. No. 14/276,914, 19 pages.

* cited by examiner

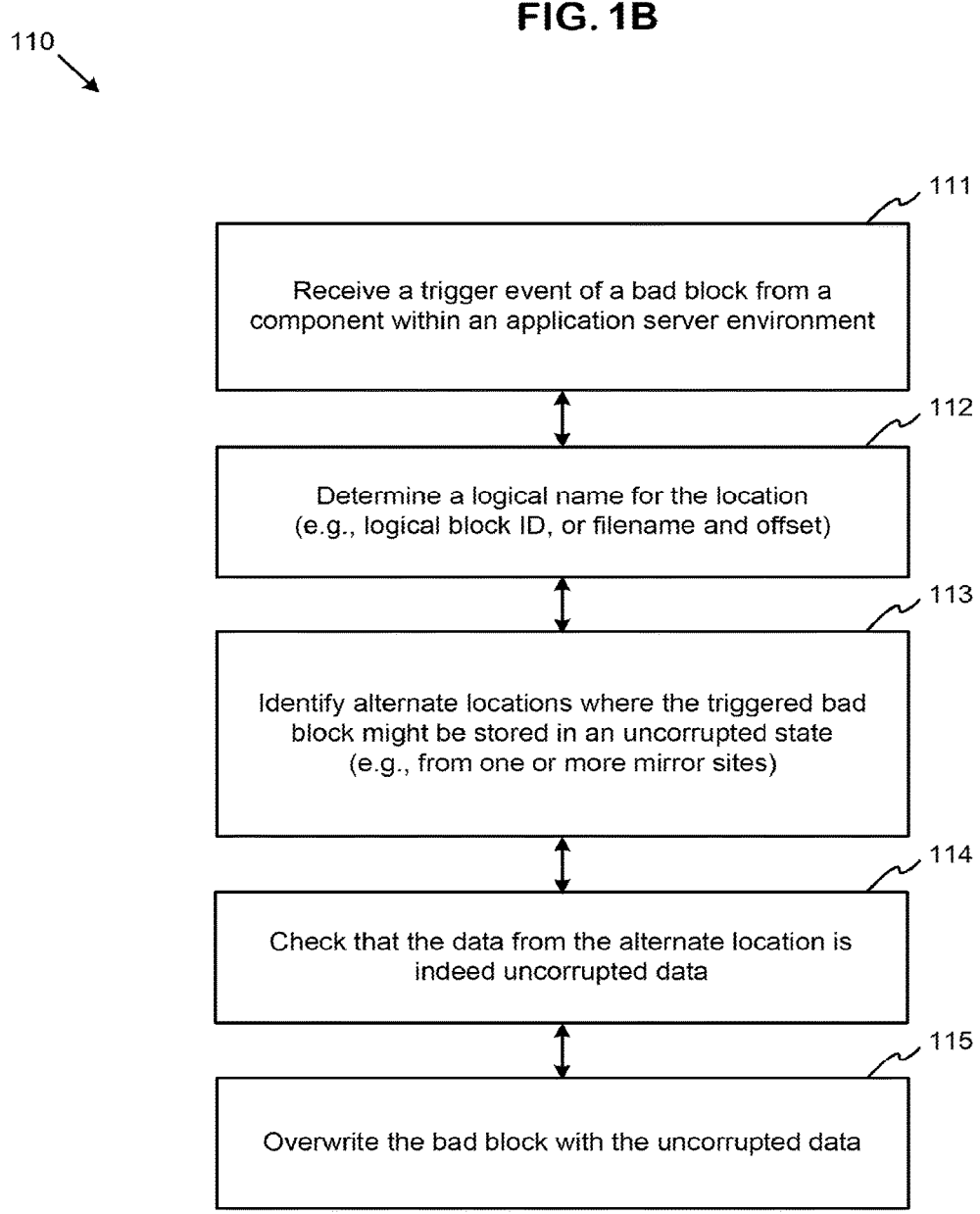

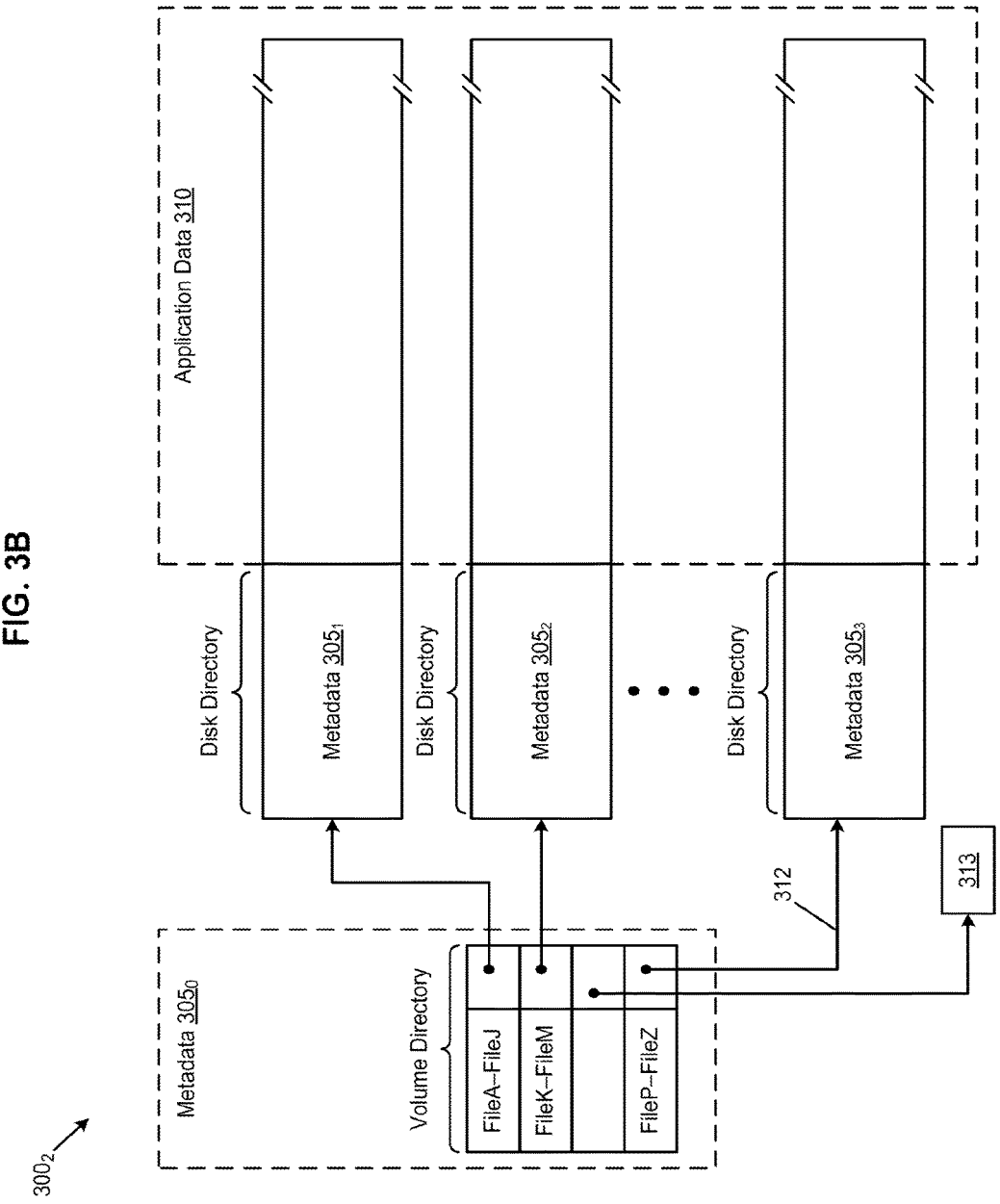

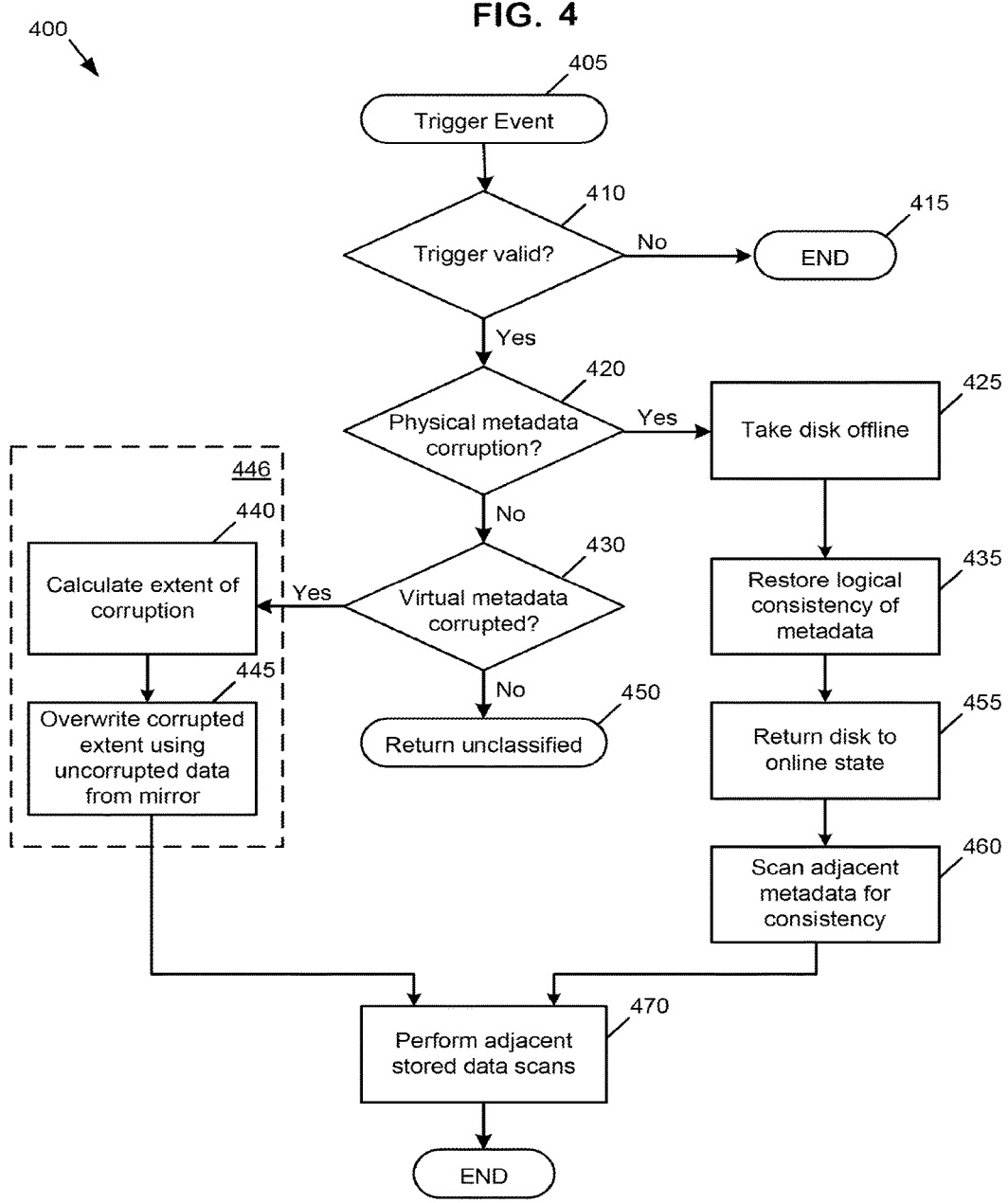

DETECTION OF LOGICAL CORRUPTION IN PERSISTENT STORAGE AND AUTOMATIC RECOVERY THEREFROM

RELATED APPLICATIONS

The present application is a Continuation of U.S. patent application Ser. No. 14/276,914, entitled "DETECTION OF LOGICAL CORRUPTION IN PERSISTENT STORAGE AND AUTOMATIC RECOVERY THEREFROM", filed May 13, 2014, which is a Continuation of U.S. patent application Ser. No. 13/223,221, entitled "DETECTION OF LOGICAL CORRUPTION IN PERSISTENT STORAGE AND AUTOMATIC RECOVERY THEREFROM", filed Aug. 31, 2011, now issued as U.S. Pat. No. 8,732,521, both of which are hereby incorporated by reference in their entirety.

FIELD

The disclosure relates to the field of data management and more particularly to persistent storage management.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Individual blocks and/or sequences or lists of blocks on a persistent storage device (e.g., a hard disk drive) can become corrupted for various reasons, such as due to software defects in any of the layers involved in the I/O path (e.g., a defect that causes the I/O to be directed to the wrong block). Or, blocks on a persistent storage device can become corrupted for electro-mechanical reasons, such as due to media degradation (e.g., bit rots, where the magnetic material decays over time), or such as due to hard disk head alignment problems (e.g., resulting in data being written to the wrong blocks). Or, in some cases, blocks on a persistent storage device can become corrupted or lost, such as due to user error (e.g., when blocks are inadvertently overwritten or accidentally lost).

Legacy hard disk drives have the capability to remap bad sectors on disks when processing a write command to write to a given block. However, in legacy implementations, firmware for the hard disks do not have any capability to recognize the fact that data in a particular block on a disk has gone bad—at least not until a process reads the bad block. Some high-end storage arrays employ a technique called "disk scrubbing", which involves a periodic reading of all of the blocks of the disk in an attempt to recognize bad blocks during the disk scrubbing process rather than wait until some other process experiences a read error (e.g., if/when a corrupted block is read). Some disk scrubbers have the capability to restore bad blocks to an uncorrupted state by retrieving an uncorrupted copy of the data from a redundant copy of that data (e.g., from a mirror site), and write the uncorrupted data to a good block, possibly also marking the corrupted block as a bad block, so that no further data writes to the back block are attempted.

However, in some situations, (e.g., when the redundancy is managed/maintained by a host-based volume manager), the aforementioned disk scrubbing technique does not work. In such situations, applications are left with the responsibility of recovering from bad blocks. Yet, in many real-world situations, the discovery of a latent bad block may go undetected over a long period of time—especially in a write-once scenario such as is used in backup or archival of data. Still worse, the existence of latent, undetected, corrupted blocks in the systems can lead to a serious data loss when a failure causes the latent, undetected, corrupted blocks from a redundant/archived copy of the data to be restored in the false assumption that the restored copy is an uncorrupted copy.

Even in high availability systems, corruption recovery techniques are not triggered until after corruption has been discovered by the application. However, as noted above, in applications where the data is written once and read very infrequently, any latent corruption (e.g., physical corruption and/or logical corruption) can go undetected for a long period of time. More particularly, backup and recovery data (e.g., data needed to recover the system from a catastrophic failure), tends to be written once and subsequently read very infrequently, so the existence of corrupted blocks can render the entire system to be highly vulnerable to a complete outage.

Moreover, the aforementioned disk scrubbing technologies do not have the capabilities to recognize logically corrupted blocks, and legacy solutions for recovering from logical corruptions do not decrease the potential for complete data loss in the event of other failures in the system.

Therefore, there is a need for an improved approach for implementing early detection of logical corruption in persistent storage devices that address at least these problems.

SUMMARY

A method, system, and computer program product for restoring blocks of data stored at a corrupted data site using two or more mirror sites. The method commences by receiving a trigger event from a component within an application server environment where the trigger event indicates detection of a corrupted data site. The trigger is classified into at least one of a plurality of trigger event types, which trigger event type signals further processing for retrieving from at least two mirror sites, a first stored data block and a second stored data block corresponding to the same logical block identifier from the first mirror site. The retrieved blocks are compared to determine a match value, and when the match value is greater than a confidence threshold, then writing good data to the corrupted data site before performing consistency checks on blocks in physical or logical proximity to the corrupted data site.

Further details of aspects, objects, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1B illustrates steps taken by components within a latent bad block detector, according to some embodiments.

FIG. 3B illustrates a disk directory layout using multiple directory levels, according to some embodiments.

FIG. 4 is a flowchart of decisions and operations for taking action when a metadata corruption is discovered, according to some embodiments.

DETAILED DESCRIPTION

Some embodiments of the present disclosure are directed to an improved approach for implementing detection of logical corruption in persistent storage and automatic recovery. More particularly, disclosed herein are a method and system for restoring corrupted data using alternate locations (e.g., any mirror sites where a redundant copy of the data exists). The method commences by receiving a trigger event where the trigger event indicates detection of corrupted data. The system commences further processing for retrieving uncorrupted data from alternate locations, which retrieved data is then compared to determine if the retrieved data can be deemed uncorrupted data, and then writing the deemed uncorrupted data to the corrupted data site before performing consistency checks on blocks in physical or logical proximity to the site of the originally-triggered corrupted data.

Figure 1A:
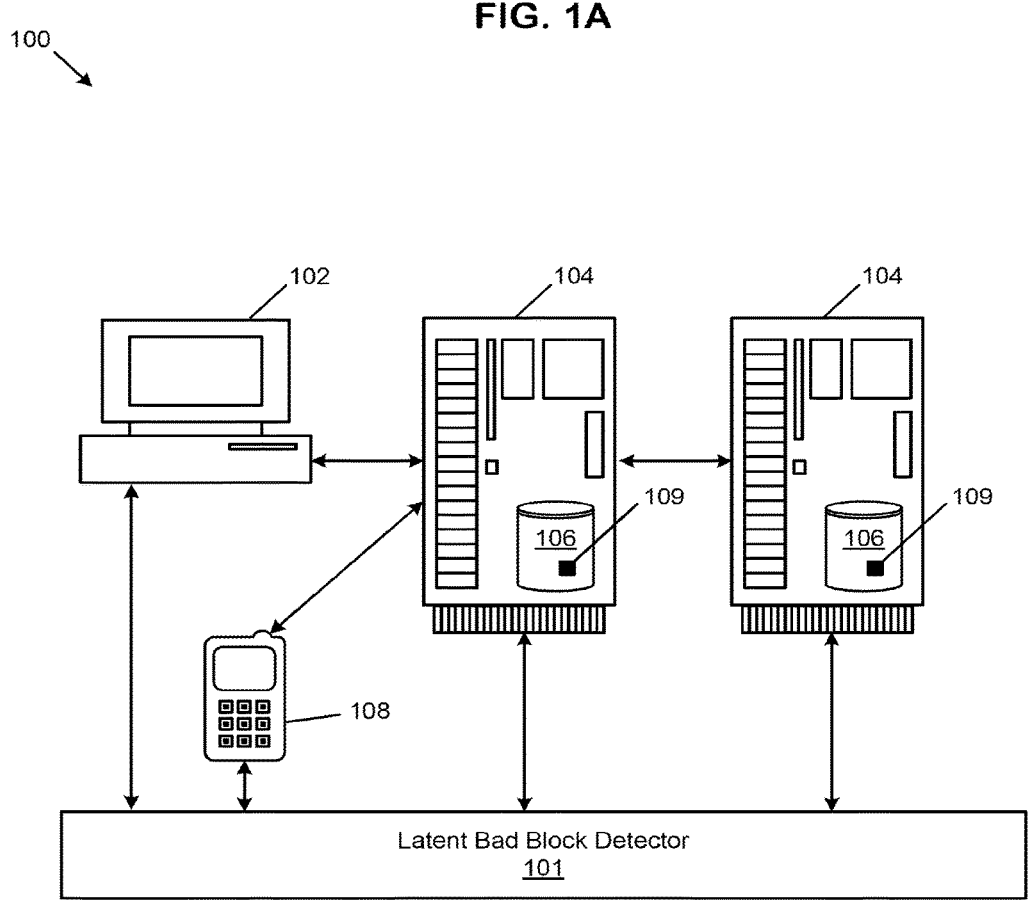
FIG. 1A illustrates the architecture of a system for implementing detection of logical corruption in persistent storage, according to some embodiments.

FIG. 1A illustrates the architecture of a system 100 for implementing detection of logical corruption in persistent storage. As aforementioned, legacy disk scrubbing technologies do not have the capabilities to recognize logically corrupted blocks, and legacy solutions for recovering from logical corruptions do not decrease the potential for complete data loss in the event of other failures in the system. Yet, following the techniques disclosed herein, it is possible to detect logical corruption at many points within a computing environment. For example, within a computing environment having persistent storage devices (e.g., hard disk drives, solid-state storage devices, etc.), exemplary embodiments are organized to implement applications that rely, at least in part, on a data repository or a data retrieval system or other form of persistent storage.

As shown, the system 100 supports one or more users at one or more user stations 102 that operate the system 100, and applications running in a user station interact with one or more instances of a volume server 104 to perform application-related activities. User station 102 comprises any type of computing station that may be used to operate with or interface with a volume server 104. Examples of such user stations 102 include, for example, workstations, personal computers, and remote computing terminals. The users at user station 102 correspond to any individual, organization, or other entity that uses system 100 to run applications. User station 102 comprises a display device, such as a display monitor or screen, for displaying text and images to users at the user station 102. User station 102 may also comprises one or more input devices for the user to provide operational control over the activities of system 100, such as a mouse, touch screen, keypad, or keyboard.

System 100 may be implemented to also include one or more mobile devices 108 to interact with applications. Instances of the mobile device 108 may comprise any type of portable or small-scale device, such as a mobile computing device that is capable of being operated without a tethered connection to volume server 104. Examples of such mobile devices 108 include, for example, mobile telephones, computing pads, computing tablets, and laptop computers.

Application data may be retrieved by a user station 102 via a volume server 104, and application data may be stored in file(s) or database stored on one or more computer readable mediums (e.g., computer readable storage devices). The computer readable storage devices comprise any combination of hardware and software that allows for ready access to the volume 106. For example, the computer readable storage device could be implemented as computer memory or disk drives operatively managed via file server middleware or any storage-related modules of an operating system running in volume server 104.

In legacy systems, detection of a corruption 109 (e.g., detection of a corrupted block, or detection of corruption of some aspect of a volume 106), and recovery actions are not triggered until after the corruption 109 has been discovered by the application (e.g., an application running within user station 102, or an application running within a mobile device 108). And, as earlier mentioned, legacy disk scrubbing technologies do not have the capabilities to recognize logically corrupted blocks, so these legacy solutions alone do not decrease the potential for complete data loss in the event of other failures in the system. Yet, following the techniques disclosed herein, it is possible to detect a corruption 109 at many points within a computing environment. For example, one or more instances of a latent bad block detector 101 can be situated in various points within a computing environment having persistent storage devices (e.g., hard disk drives, solid-state storage devices, etc.). In exemplary embodiments, one or more instances of a latent bad block detector 101 can be situated in a mass storage ecosystem to facilitate detection of corruption 109 in persistent storage.

FIG. 1B illustrates steps taken by components within a latent bad block detector 101. As illustrated in the flow of FIG. 1B, one step is configured to receive a trigger event of a corruption 109 from a component within an application server environment (see step 111) and, after receiving the trigger event, another step determines a logical name for the location (see step 112). In some embodiments, the trigger event might correspond to corruption of a block in a file, in which case the bad block can be identified by filename and offset. Or, the trigger event might correspond to a bad sector on a disk. In any of such cases, an alternate site for the data (e.g., a copy, a RAID mirror, a server mirror, etc.) might exist, and the presumably uncorrupted data can be retrieved from that location (see step 113). Then, steps are configured to check that the data from the alternate location is indeed uncorrupted data (see step 114) such that the corruption 109 can be overwritten using the uncorrupted data (see step 115).

Again referring to FIG. 1A, any one or more of the steps of FIG. 1B can be performed using the latent bad block detector 101 and, moreover, the latent bad block detection can occur anywhere within the mass storage ecosystem embodied in system 100.

Figure 1C:
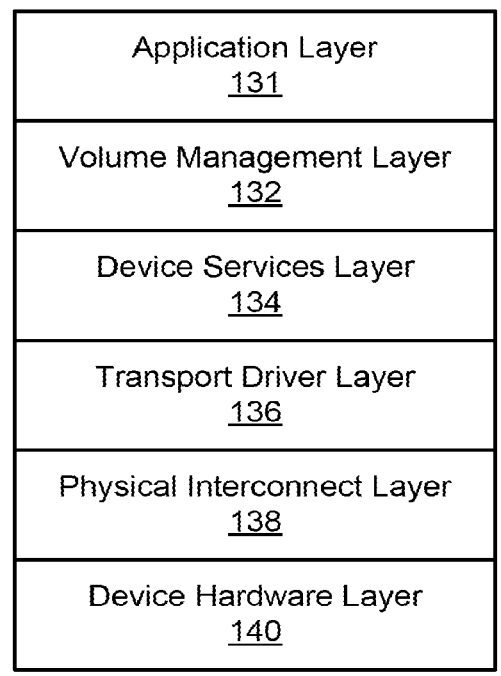
FIG. 1C illustrates a mass storage ecosystem organized into a mass storage stack, according to some embodiments.

FIG. 1C illustrates a mass storage ecosystem organized into a mass storage stack. As shown, a mass storage stack 130 has an application layer 131, a volume management layer 132, a device services layer 134, a transport driver layer 136, a physical interconnect layer 138, and a layer comprising the hardware for actually storing data, namely the device hardware layer 140. A layer is defined by rules or protocols observed for communicating between adjacent layers. For example, an application layer might not need to participate in any protocol pertinent to the device services layer 134. In fact, a component observing the application layer boundaries might not be aware that a disk group layout is implemented at the device services layer. Nor is it necessary that a component observing the application layer boundaries be aware that a disk group layout operation (e.g., a RAID operation) had been performed, or that a disk group layout operation had succeeded or failed.

Although the nomenclature of the aforementioned mass storage stack suggests a strong division between logical operations (e.g., application layer, volume management layer, etc.) and physical operations (e.g., physical interconnect layer, device hardware layer, etc.), it is reasonable and envisioned, and disclosed herein that detection of logical corruption in persistent storage and automatic recovery can occur and/or be performed at any one or more levels in the mass storage stack.

In some implementations, multiple layers in the mass storage stack can serve to detect and repair logical corruptions of data. Some embodiments implement storage subsystems configured to detect logical corruptions, and raise a trigger event. Logical corruptions can occur as an effect of operation of any components in system 100 corresponding to any one or more of the following scenarios:

1. Manually-invoked checks: The user could potentially raise a trigger event to invoke a manual check that allows the storage subsystem to scan a storage volume or device for the purpose of detecting instances of logical corruption. In exemplary instances of this scenario, the trigger event is raised by an application server, possibly under direction of a user through a user station.

2. Automatically-invoked checks: The storage subsystem can be configured to perform periodic checks to look for instances of logical corruption. In exemplary instances of this scenario, the trigger event is raised by a storage subsystem volume manager.

3. Application-invoked checks (e.g., software application executing within the application layer) configured to detect a logical corruption: A logical corruption introduced by an application is generally unintended, however it might not be discovered until some later processing within the application. In cases where the application can discover a logical corruption, the application can provide notice to other layers in the mass storage stack. Or, for example, an application might self-repair corrupted data by informing the storage subsystem, possibly by indicating identifying information to another layer in the mass storage stack (e.g., identifying information as to the device and file or other location in the device where logical corruption was discovered).

4. Invocation of checks for corruption near the site of detected corruption: For example, a check might be performed on physical sectors #3, #4, #6, and #7 if a corruption were detected in sector #5. Or, for example, a check might be performed on logical blocks #3, #4, #6, and #7 if a corruption were detected in logical block #5. Using known techniques, a block can be identified using a logical block address (LBA), or a sector and offset physical address, or any other technique, and as used herein a block can be identified using a block identifier. In exemplary instances of this scenario, the trigger event is raised by a storage subsystem volume manager.

Any one or more of the above techniques for invocation can be employed in an application server environment, and any one or more of the above techniques for invocation can be employed at any layer in a mass storage stack.

Figure 1D:
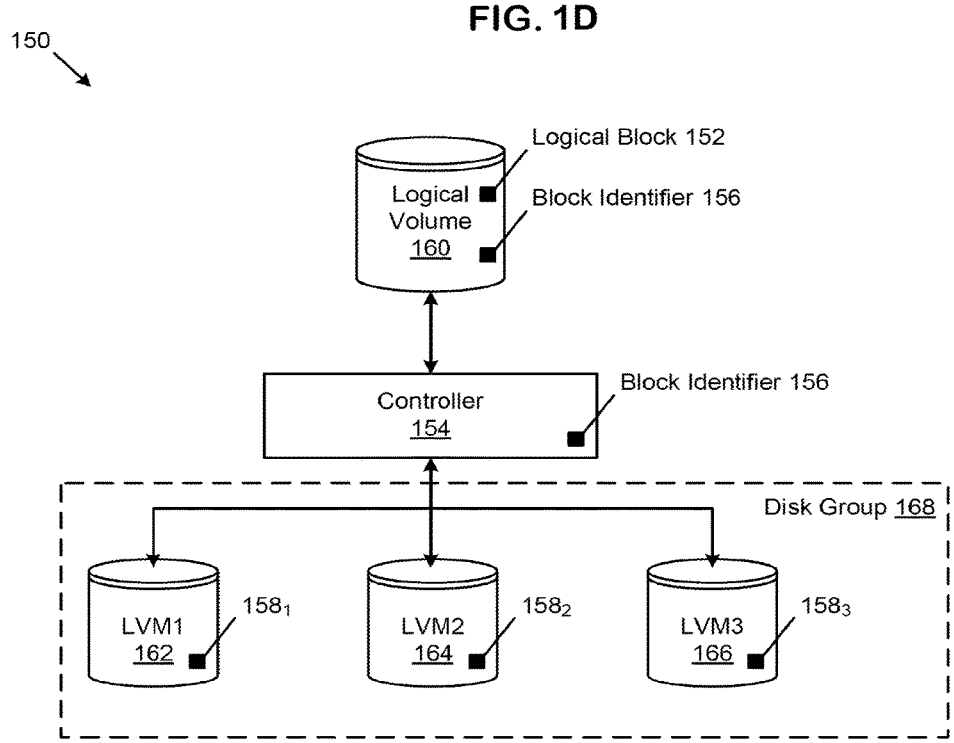
FIG. 1D illustrates components within selected layers in the mass storage stack, according to some embodiments.

FIG. 1D illustrates components within selected layers 150 in the mass storage stack. As shown, a logical volume 160 comprises a number of instances of a logical block 152. The logical volume is a virtual construction, having actual persistent physical storage in one or more physical storage devices, which physical storage devices can be assigned to a disk group. A disk group 168 can be managed in any of many regimes such as a JBOD, a RAID0 volume, a RAID1 volume, or any manner of mirrored volumes. As shown, the disk group 168 comprises three mirrored sites, namely LVM1 162, LVM2 164, and LVM3 166. A mirrored site comprises blocks, and in the case that a given block is intended to contain some particular data (e.g., application data), such blocks are written to each mirrored site in the disk group 168 such that the same data can exist as stored on a physical storage device in the form of individually accessible logical blocks. As shown, LVM1 162 stores logical block 158$_1$, LVM2 164 stores logical block 158$_2$, and LVM3 166 stores logical block 158$_3$, Any individually accessible logical block can be retrieved using a unique address (e.g., a block identifier), which address can be formed of a physical address (e.g., addressing a particular physical storage device) combined with a logical block identifier (e.g., the aforementioned LBA). In exemplary embodiments, a disk group 168 is controlled by a controller 154, which controller is configured to access any individual portion of stored persistent data by at least the block identifier 156. Alternatively, the controller 154 can access any individual portion of stored persistent data by a sector identifier.

Figure 2:
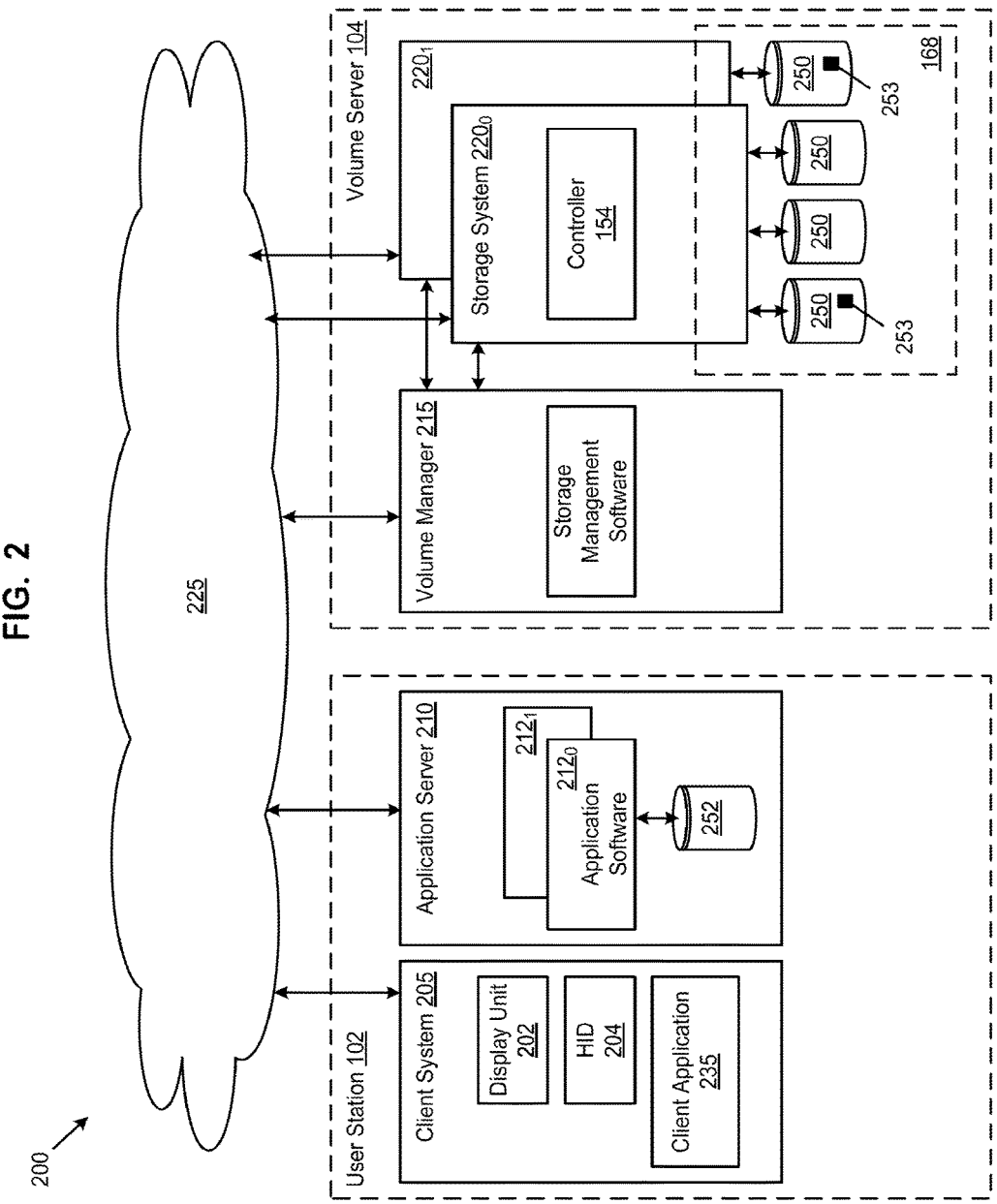
FIG. 2 illustrates a block diagram of an exemplary application server environment, according to some embodiments.

FIG. 2 illustrates a block diagram of an exemplary application server environment 200 in which some embodiments operate. As compared with system 100, the components within application server environment 200 comprise additional components, which components implement some or all of the mass storage stack 130. As shown, the application server environment 200 implements a user station 102 in the form of a client system 205 connected to an application server 210. Also, the application server environment 200 implements a volume server 104 comprising a volume manager 215 connected to one or more instances of a storage system 220. A set of one or more application servers 210 can also be connected to one or more client systems 205 via a network 225. The application server 210 may have local storage 252, or may access the one or more storage systems 220, each storage system 220 having a set of one or more storage devices 250. The application server 210 is also connected via network 225 for communicating with other components for working collectively to provide application services to the client systems 205 and for collectively hosting a plurality of application software modules 212 for implementing a software application. A disk group 168 can be configured to comprise only the storage devices 250 that are part of a particular instance of a storage system (e.g., storage system $220_0$) or, in some embodiments, a disk group 168 can be configured to comprise any storage devices 250, possibly including any arbitrary set of storage devices that are distally located. As used herein, a mirror site can comprise any one or more instances of local storage 252, any one or more instances of storage devices 250, any disk group, or even any storage system 220.

A client system 205 may comprise a computer system that may execute a client application 235 that interacts with an application server 210 for submitting configuration and/or read-write access requests and for receiving or transmitting data from or to the application server 210 over the network 225. A user may interface with the client application 235 through a user interface, possibly using a display unit 202, and/or using a human interface device 204.

An application server 210 may comprise a computer system that may execute a server application that interacts with the client systems 205 for receiving configuration and/or read-write access requests from, and for receiving or transmitting data from or to the client systems 205 over the network 225. An application server 210 may be connected to the client systems 205 over a network 225 such as a local area network (LAN), an Ethernet subnet, a PCI or PCIe subnet, a switched PCIe subnet, a wide area network (WAN), a metropolitan area network (MAN), the Internet, or the like. In some embodiments, an application server 210 may comprise a chassis hosting multiple instances of computing blades, and/or the application servers 210 may be embodied as virtual machines (e.g., one virtual machine per each client system 205). The network 225 and/or subnets of networks 225 may be physically embodied within such a chassis.

A server application executing on an application server 210 may provide application software services to client system 205 by receiving and processing input from the client system 205 for access to data from the storage system(s) 220. A storage system 220 may be coupled locally to an application server 210 over a network 225 such as a local area network (LAN), an Ethernet subnet, a PCI or PCIe subnet, a switched PCIe subnet, a wide area network (WAN), a metropolitan area network (MAN), the Internet, or the like. In fact in some embodiments, an application server 210 may comprise a chassis hosting multiple instances of an application server 210 within a single chassis (e.g., a blade server chassis), with each instance of an application server 210 in communication with each other instance of an application server 210 via a network within the chassis.

Interaction between the application server 210 and the storage system(s) 220 can enable the provision of storage services. That is, the application server 210 may request the services of the storage system(s) 220 (by submitting configuration and/or read-write access requests), and the storage system(s) 220 may respond to configuration and/or read-write access requests of the application server 210 by receiving or transmitting data to the application server 210 over the network 225 (e.g., by exchanging data packets through a connection over the network 225).

Some embodiments include a volume manager 215. A volume manager is a computing platform capable of executing storage management software configured to manage a volume of data, possibly involving multiple copies of the same logical data, and possibly involving one or more storage systems 220, which storage systems 220 may be located in any location, and nevertheless communicate via a network 225 (e.g., to or with other components within application server environment 200). In some cases, multiple copies of the same logical data are stored in relatively close physical proximity, for example using multiple drives hosted in the same chassis. In other cases, multiple copies of the same logical data are stored in relatively distal physical proximity, for example at different sites, or in different cities, or even on different continents. Any persistent storage site for storing any second or Nth copies of the same logical data is termed a mirror site. Any one or more storage devices 250 can contain application data (e.g., as written using an application server). Or, due (for example) to the aforementioned characteristics of persistent storage, any one or more storage devices 250 can contain instances of a corrupted data site 253 (e.g., physically bad blocks, physically bad sectors, logically corrupted blocks, etc.). In some embodiments, multiple storage systems (e.g., storage system $220_0$ and storage system $220_1$ etc.) can be configured into a disk group.

In some cases, the same logical data is intended to be stored on a mirror site, but due to errors, logical data intended to have been stored on a mirror site may differ from the data actually stored on another mirror site. Multiple mirror site copies of logical data are managed by a volume manager 215. Communications between a volume manager 215 and a storage system 220 and any instances of an application server 210 are typically embodied as communication packets sent over the network 225. An application server 210 may send an access request (e.g., a configuration and/or read-write access request) to the volume manager 215 (or directly to the storage system 220) for accessing particular data stored on an instance of a storage system 220. The application server 210 may request the services of a volume manager 215 or a storage system 220 by issuing storage-access protocol messages formatted in accordance with a conventional storage-access protocol for accessing storage devices (such as CIFS, NFS, etc.). Access requests (e.g., configuration and/or read-write access requests) may be implemented by issuing packets using file-based access protocols—such as the common Internet file system (CIFS) protocol or network file system (NFS) protocol—over the transmission control protocol/Internet protocol (TCP/IP) when accessing data in the form of files and/or directories. Alternatively, the application server 210 may issue access requests by issuing packets using block-based access protocols—such as the fibre channel protocol (FCP), or Internet small computer system interface (iSCSI), or storage area network (SAN) access—when accessing data in the form of blocks.

An application server 210 may utilize the services of a volume manager 215 or a storage system 220 to store and manage data. The storage system 220 may comprise a computer system that stores data in a set of one or more storage devices 250. A storage device 250 may comprise writable storage device media such as disk devices, video tape, optical devices, DVDs, magnetic tape, flash memory, magnetic random access memory (MRAM), phase change RAM (PRAM), or any other similar media adapted to store information (including data and parity information).

With or without the presence of a volume manager 215, a storage device 250 may have one or more storage volumes, where each volume has a file system implemented on the volume (also see FIG. 1C). A file system implemented on the storage devices 250 may provide multiple directories in a single volume, each directory containing filenames. A file system provides a logical representation of how data (e.g., relational database tables, files, etc.) are organized on a volume where data are represented as filenames that are organized into one or more directories.

Of course, the foregoing storage is subject to any of the various sorts of corruption as earlier described, and various techniques for detection of logical corruption in persistent storage and various techniques for automatic recovery are disclosed herein.

Corruption Detection Techniques

There are many techniques to determine if a given block is logically corrupted. For example, a client application 235 can be configured to explicitly indicate to the storage subsystem that a block that was read was deemed to be logically corrupted. Or, components of a storage subsystem can be configured to perform basic validations of the data read.

In either or both of the above scenarios, when one or more blocks on a given disk are deemed to be corrupted, the storage subsystem can take proactive corrective actions to restore the corrupted blocks to an uncorrupted state. In some cases, the restoration of the corrupted blocks is facilitated by the existence of other (i.e., uncorrupted) copies of the logical blocks that were deemed as corrupted data. In such a case, one possible recovery action involves copying an uncorrupted copy of the data to overwrite the corrupted block or blocks.

Further corrective actions can be taken as well. For example, the mere fact of detection of logically corrupted data suggests that the underlying physical media might be unreliable as persistent storage. In such a case, using known techniques, the suspected bad block or blocks can be remapped so as to become henceforth unused.

In certain embodiments, such remapping is known as retiring bad blocks. In the storage implementations discussed herein, persistent storage comprises application data, and data describing the application data, the latter sometimes known as metadata. Such metadata can be further classified into physical metadata (e.g., metadata referring to physical locations of persistent storage, such as a physical sector identifier), or classified into virtual metadata (e.g., metadata referring to aspects other than locations of persistent storage, such as the number of times a block has been accessed, or a timestamp, or a file size, etc.).

Figure 3A:
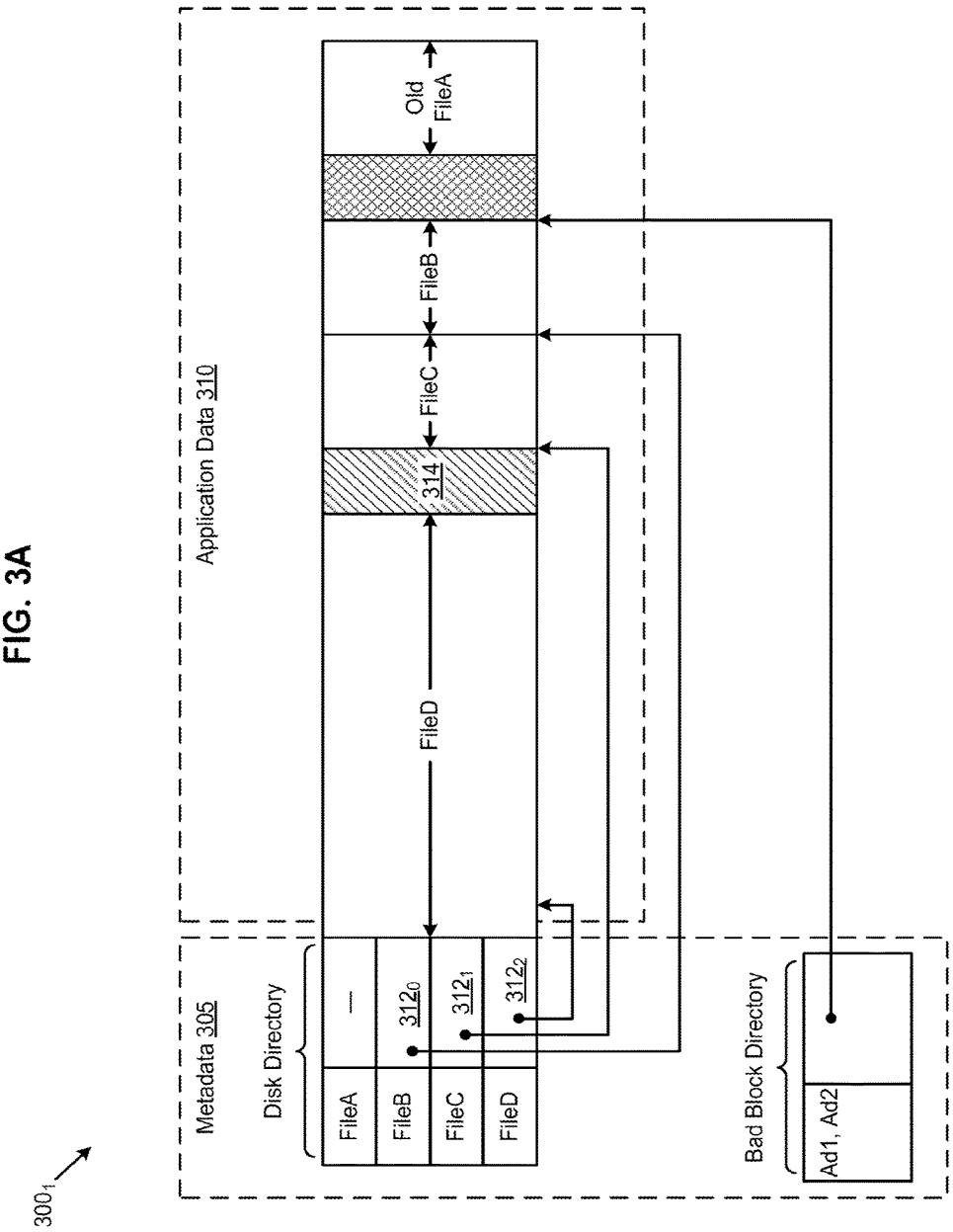
FIG. 3A illustrates an exemplary disk directory layout of metadata and application data, according to some embodiments.

FIG. 3A illustrates an exemplary disk directory layout $300_1$ of metadata and application data. As shown, application data 310 is comprised of files, namely FileD, FileC, FileB, in juxtaposition with metadata 305. In this embodiment, metadata 305 includes a disk directory, which disk directory in turn includes a list of name-address pairs. As shown, the disk directory entry for FileB holds the name of the file ("FileB") and an address to the beginning of the file (see logical pointer $312_0$). Also shown is a portion of the layout that is unused, namely unused block range 314, and also shown is a bad block directory. In some embodiments, a bad block directory is a list of bad blocks by address, or offset, or logical block number, or other block identifier. In other embodiments, a bad block directory is organized as an array of bits, a given bit representing a good block (e.g., logic '1') or a bad block (e.g., logic '0'). Using these or other known techniques for identifying bad blocks, any bad block or range of bad blocks can be stored persistently.

As shown in FIG. 3A, a disk directory within the metadata 305, is laid out separately from application data 310. This is purely illustrative, and other layouts are possible, including multi-level disk directories.

FIG. 3B illustrates a disk directory layout $300_2$ using multiple directory levels. As shown, a multi-level disk directory can be formed using a volume directory (see metadata $305_0$, and one or more disk directory instances (see metadata $305_1$, metadata $305_2$, metadata $305_3$). In some embodiments, each disk directory is stored on a separate disk device, and the volume directory is stored on yet a different disk device. As shown the combination of the volume directory and the several disk directories form a two-level directory. However, this is purely exemplary, and additional levels of hierarchy are possible. In cases of multi-level directories, one level that points to another level (e.g., using a logical pointer 312) is said to be adjacent or logically proximal.

It is possible that a directory entry in any level of metadata can be corrupted, and can point to an invalid location 313 that is not within the range of the metadata (e.g., $305_0$, $305_3$), or within the range of the application data 310. This type of a metadata corruption, as well as other types of metadata corruption, are known as metadata inconsistency or metadata inconsistencies.

Actions when Corruption is Discovered

FIG. 4 is a flowchart of decisions and operations for taking action when a metadata corruption (e.g., an example of a logical corruption) is discovered. As shown, the action or actions taken when a metadata corruption is discovered depends the type of data that was deemed to have been corrupted. Accordingly, the trigger event is classified into one of several types; for example, a physical metadata corruption trigger, a virtual metadata corruption trigger, etc. Techniques for, and actions taken upon, classifying the trigger event into one of a plurality of trigger event types are further described as follows.

In some cases, if the physical metadata of a disk is deemed to have been corrupted, the action taken might include automatically taking the disk offline (see operation 425). On the other hand, if the logical corruption was detected in any of the virtual metadata or if the corruption was detected in the user data, the corrupted data might be subjected to further operations to determine if and how any one or more copies of uncorrupted data can be recovered (e.g., via an automatic recovery by reading data from mirror sites). In some cases after a recovery operation, proactive checks (e.g., scan for other physically proximal corruptions, scan for other logically proximal corruptions, etc.) may be executed. And, in some cases a disk that was taken offline due to detection of a logical corruption goes through extra scan pass(es), which scan passes attempt to identify additional physical or logical corruptions. In some situations, the aforementioned additional physical or logical corruptions may be marked (e.g., as 'stale'), which marking in turn can invoke further corrective actions (e.g., forcing subsequent online operations to resynchronize the marked blocks). In still other situations, performing a logical consistency check to identify additional physical or logical corruptions can include marking a block to signal subsequent online operations to explicitly resynchronize the marked block.

Actions when Corruption is Discovered

Again referring to FIG. 4, the steps for taking action when a logical corruption is discovered covers many cases. As shown, the flow begins from the start entry point, given a trigger event 405, and performs tests to determine if the trigger event is valid (see decision 410). If the trigger event is deemed not valid, then the flow 400 is terminated (see terminus 415). On the other hand, if the trigger event is deemed as valid, then additional decisions are take to determine if the trigger event refers to a physical metadata corruption (see decision 420) or, if the trigger event refers to a virtual metadata corruption (see decision 430), then different branches are taken depending on the Yes/No result of the decision 430 (e.g., branch to operation 440 if Yes, or branch to operation 450 if No). Again referring to decision 420, in the case that the trigger event refers to a physical metadata corruption, then this is regarded as a sufficiently serious condition to warrant taking the disk offline (see operation 425), after which, further steps are taken to restore the logical consistency of the metadata (see operation 435), return the disk to an online state (see operation 455), and scan adjacent metadata for consistency (see operation 460). Still additional scans may then be performed on other data stored on the disk (see operation 470), which additional scans are further discussed below. As regards the steps taken to restore the logical consistency of the metadata (again, see operation 435), metadata can be reconstructed by correlating with redundant metadata that is known to be good. In some cases, redundant metadata that is known to be good is explicitly maintained for the purpose of such a restoration. In still other cases, the logical consistency of the metadata can be restored by scanning the disk for client data (e.g., via fsck), inferring the allocation, and constructing metadata.

If the physical metadata was not deemed as corrupted (see decision 420) and the trigger event had been deemed as valid (see decision 410), then it is possible that the trigger event refers to a detected corruption in virtual metadata, in which case (if true) the decision 430 will proceed to perform operations to calculate the extent of the corruption (see operation 440) and to use uncorrupted data retrieved from a mirror site (see operation 445). After using the uncorrupted data retrieved from a mirror site (e.g., to restore the data from the uncorrupted site), scans of adjacent stored data can be performed (see operation 470).

Such scans of adjacent stored data may be for the purpose of performing a logical consistency check on at least a portion of blocks in physical proximity to the corrupted data site. Or, such scans of adjacent stored data may be for the purpose of performing a logical consistency check on at least a portion of blocks in logical proximity to the corrupted data site. For example, blocks in logical proximity can include blocks in a list (e.g., a linked list) of blocks that logically comprise a unit. That is, the unit is deemed logically consistent if the list order (e.g., list pointers) is intact and without unintended undefined references or unintended circular references.

The operations to calculate the extent of corruption and to restore from a mirror site (see operation group 446) can involve additional decisions and operations, which are briefly discussed below.

Figure 5:
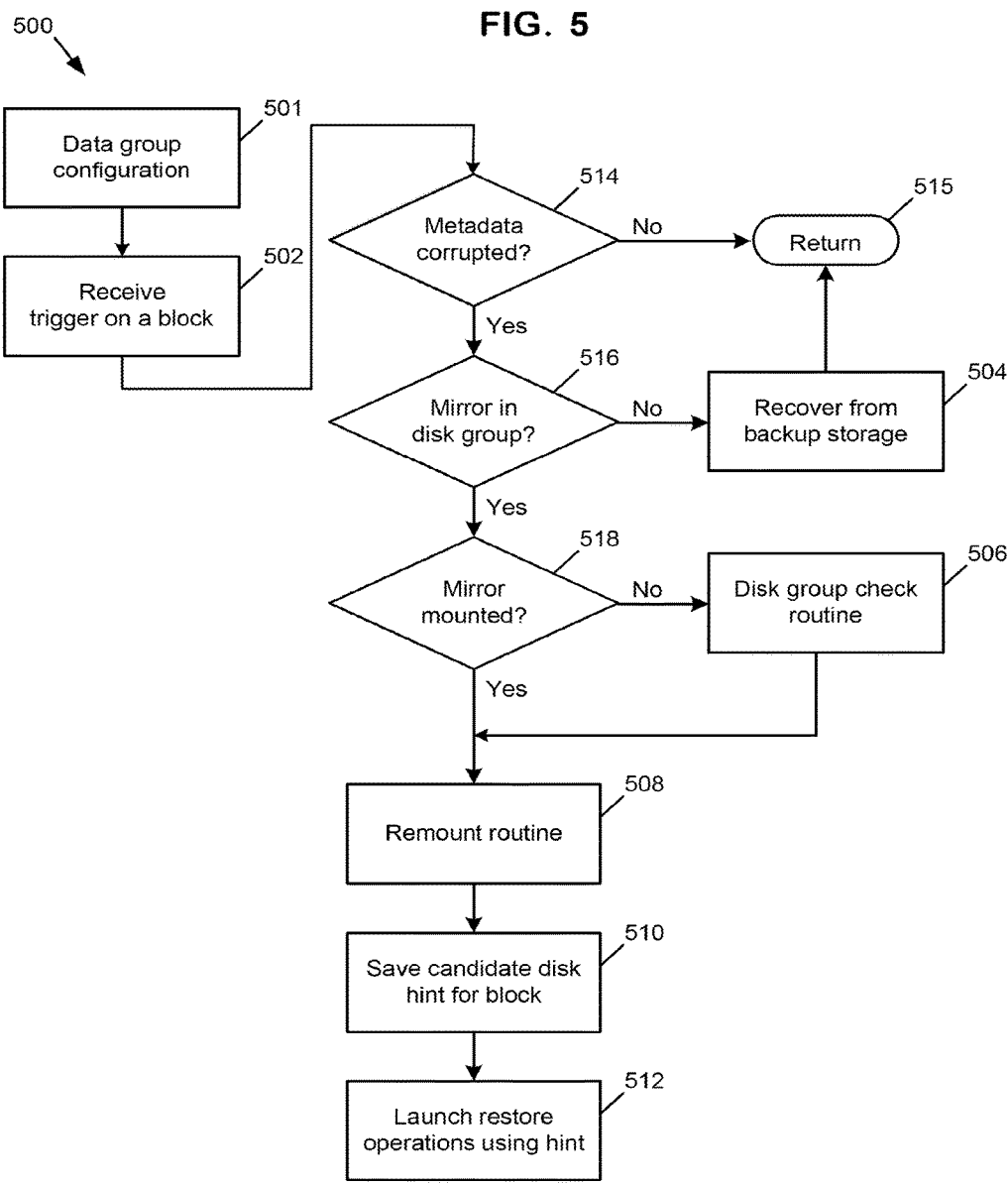
FIG. 5 is a flowchart of decisions and operations for handling metadata trigger events, according to some embodiments.

FIG. 5 is a flowchart 500 of decisions and operations for handling metadata trigger events. The operations of FIG. 5 correspond to the aforementioned operation group 446 (see FIG. 4). As previously mentioned, multiple copies of the same logical data can be stored in mirror site copies, or, more generally, in a disk group 168. A disk group 168 can be configured at any point in time by an administrator (see operation 501), and the configured disk group can be brought online for storage of data (e.g., physical metadata, virtual metadata, application data, user data, etc.). At some later point in time, after at least some data is stored in the disk group, a trigger event might be received, the trigger event indicating a possible error within a block of data (see operation 502). That is, a storage error may be detected when accessing storage when the underlying storage becomes corrupted. As earlier indicated, detection of such an error can occur within any one or more layers (see FIG. 1C), and regardless of the location of the detection of the error, the receipt of a trigger event indicating detection of a storage error then causes procession through the decisions and operations of flowchart 500. When the underlying storage is configured in a redundancy disk group, then recovery using mirror sites can be performed. As shown, the decisions and operations for handling metadata trigger events checks (see decision 514), or re-checks, if the trigger event results from a metadata inconsistency. If not, then return (see terminus 515). If so, then decision 516 is taken after determining if the block is a block that is stored in multiple locations (e.g., in a disk group). If the block is not stored in multiple locations, then recovery of uncorrupted data might be performed by a recovery operation using backup storage (see operation 504). Alternatively, if the block is stored in multiple locations, then recovery might be performed by operations on one or more of the mirror sites in the disk group. To perform a recovery from a mirror site, at least one mirror site contains the data of the block in an uncorrupted form. However, it sometimes happens in a disk group that a corruption written to one mirror site within a disk group is also written to other mirror sites in that disk group. Further, in some cases, a corruption (e.g., a physical metadata corruption) is detected at a low level in the mass storage stack 130. Accordingly, operations within that low level of the mass storage stack 130 might take the mirrored disk offline, awaiting corrective action by (for example) an operator or administrator. In some cases at least some corrective action can be taken automatically, as is shown in the flowchart of FIG. 5. Specifically, if there is a mirror in the disk group (see decision 516), and if the mirror site is not mounted (see decision 518), then a disk group check routine might be executed (see operation 506). In certain cases, execution of a disk group check routine can correct errors such that the mirror site can safely be brought back online via a remount routine (see operation 508). Such corrective actions might result in bringing a mirror site back online in an uncorrupted state (or such corrective actions might result in taking the disk offline if a disk header corruption is detected). Even in the case that a mirror site is brought back online in an uncorrupted state, a full restoration might involve still further operations. As shown, after a performing a remount routine (see operation 508), the triggered block or disk group identifier or other hint might be saved in a data structure, or in memory, or in a communication packet (see operation 510) and used when launching additional restore operations (see operation 512).

Figure 6A:
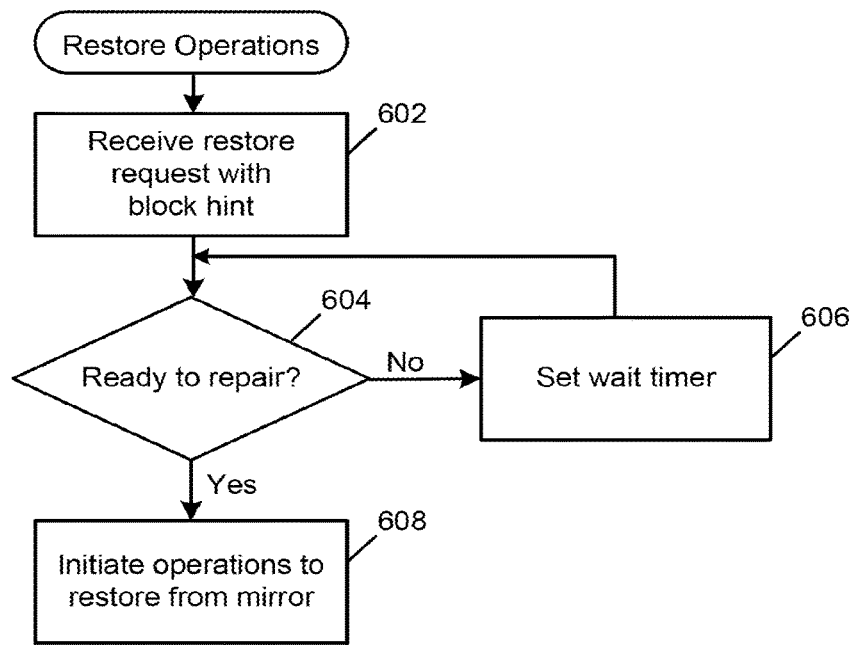
FIG. 6A is a flowchart of decisions and operations to initiate restore operations given a block identifier, according to some embodiments.

FIG. 6A is a flowchart of decisions and operations to initiate restore operations given a block identifier. In some cases, restore operations can proceed immediately (e.g., synchronously) upon receipt of a request for restore operations (see operation 602), or a time delay can be introduced (see decision 604 and operation 606). For example, decision 604 might determine that the block hint received in operation 602 is one of a group of blocks, and additional block hints should be collected before initiating operations to restore from a mirror site. In such a case, operation 606 sets a timer to wait some prescribed duration before checking again. The prescribed duration can be determined using various techniques, and the decision 604 can include checking for a timeout value. As shown, when ready to repair, the flow proceeds to initiate operations to restore from a mirror site (see operation 608). Returning to decision 604, tests conducted in reaching the decision 604 might determine that the block hint received in operation 602 is one of a group of blocks (e.g., any portion of a disk group). Or, the hint can be very granular (e.g., a hint referring to one particular specific block). Or, it is also possible that the hint is very general (e.g., a hint referring to a group of blocks within which the hint lies).

Figure 6B:
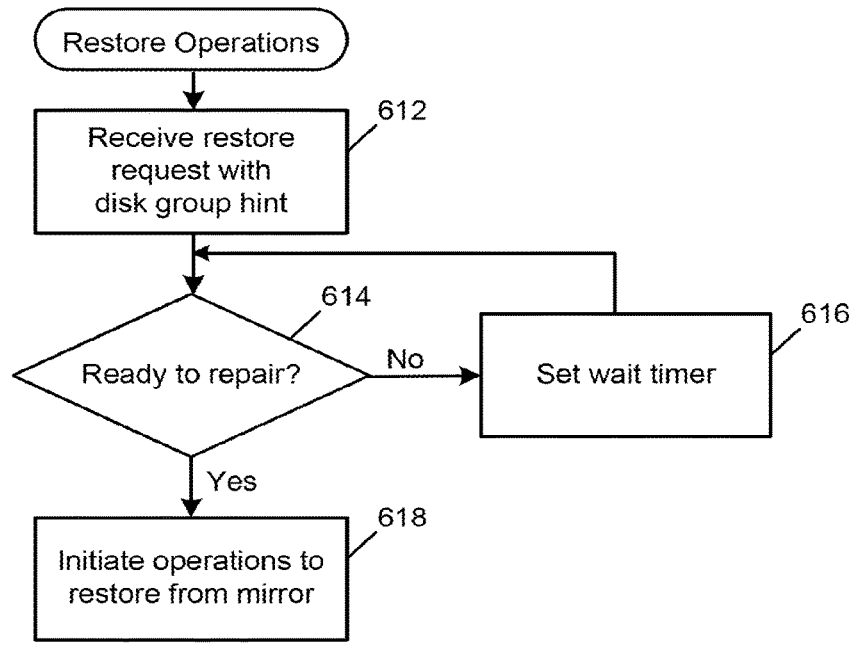
FIG. 6B is a flowchart of decisions and operations to initiate restore operations given a disk group identifier, according to some embodiments.

FIG. 6B is a flowchart of decisions and operations to initiate restore operations given a disk group identifier. In some cases, restore operations can proceed immediately (e.g., synchronously) upon receipt of a request for restore operations given a disk group identifier (see operation 612), or a time delay can be introduced (see decision 614 and operation 616). For example, decision 614 might determine that the disk group hint received in operation 612 is one of a group of blocks, and additional block hints should be collected before initiating operations to restore from a mirror site. In such a case, operation 616 sets a timer to wait some prescribed duration before checking again. The prescribed duration can be determined using various techniques, and the decision 614 can include checking for a timeout value. As shown, when ready to repair, the flow proceeds to initiate operations to restore from a mirror site (see operation 618).

Figure 7:
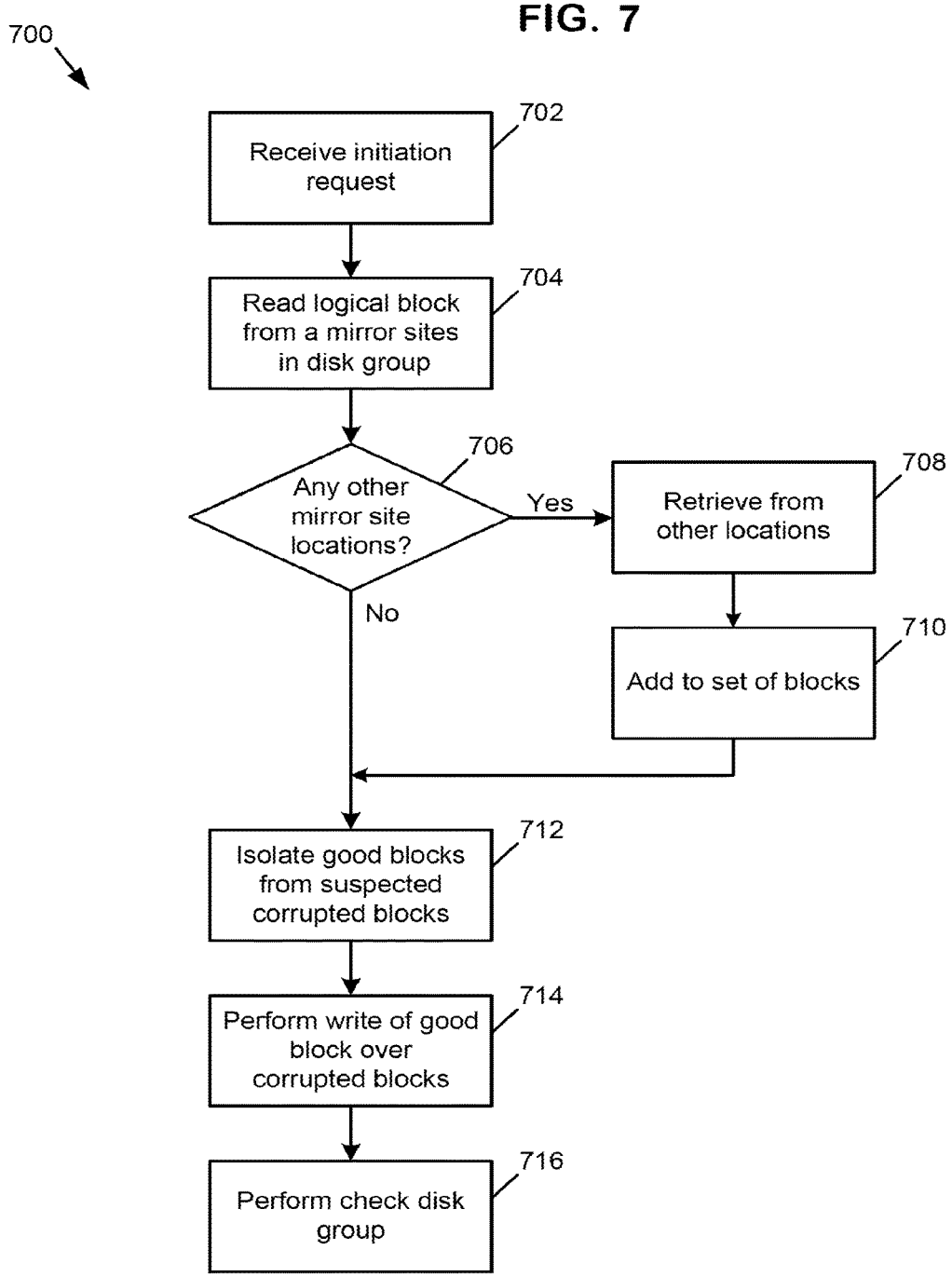
FIG. 7 is a flowchart of decisions and operations to perform restore operations from a mirror site, according to some embodiments.

FIG. 7 is a flowchart of decisions and operations to perform restore operations from a mirror site. The steps to perform restore operations from a mirror site 700 commences upon receipt of a request (see operation 702). As shown, such a request comprises a block identifier, such that the block corresponding to the block identifier can be read from each mirror site in the corresponding disk group (see operation 704). In some cases, it is possible that a copy of the data corresponding to the block as given by the block identifier can be stored in a location other than a location within the corresponding disk group. In such a case, that scenario is detected, and decision 706 is taken to retrieve that block's data from the other location (see operation 708), and if that operation were successful, then that block's data (e.g., that block's data as retrieved from the other location) is added to a set of block data for subsequent operations (see operation 710). On the other hand, it is possible that a copy of the data corresponding to the block is given by the block identifier, copies of which data are stored in mirror sites belonging to the corresponding disk group, and those copies of the block's data (e.g., those copies as retrieved from the mirror sites) is added to a set of block data for subsequent operations.

Subsequent operations can include, for example operations to isolate known good blocks from suspected corrupted blocks (see operation 712). Such isolation (e.g., separation into two or more sets) can include a comparison operation to compare a known good block to a suspected corrupted block to determine a match value from the comparison operation. Once such an isolation is deemed successful (e.g., a confidence value of the isolation of good blocks from suspected corrupted blocks), then the contents of a good block can be written to all locations where a suspected corrupted block was found (see operation 714). A further check might be performed (e.g., check disk group) to verify that all of the newly-written blocks written onto the mirror sites in the disk group are indeed logically consistent (see operation 716). In still other embodiments, comparing one data block to another, a match value can comprise a logical analysis. For example, if a data block were intended to comprise a portion of a linked list, and the links were coded as physical addresses, it is possible that two uncorrupted blocks might not compare when using an exact byte-for-byte comparison.

The aforementioned confidence value can be determined using any one or more of a variety of comparison techniques. When using byte-for-byte comparison techniques, the comparing comprises an exact byte-for-byte comparison across all bytes in the block. However, in some situations, blocks on a first mirror site can be stored in a physical block format different from a second mirror site. For example, a first mirror site can use a CIFS file system format, and a second mirror site can use an NFS file system format, or either mirror site can use any file or block layout. In this latter case where blocks on a first mirror site are stored in a physical block format that differs from the physical block format of a second mirror site, rather than a byte-for-byte comparison, a data-wise, logical comparison is used when comparing a block from a first mirror site to a block from a second mirror site. In using any such techniques to determine a match value, a confidence flag can be raised when the match value is greater than a particular confidence threshold.

Figure 8:
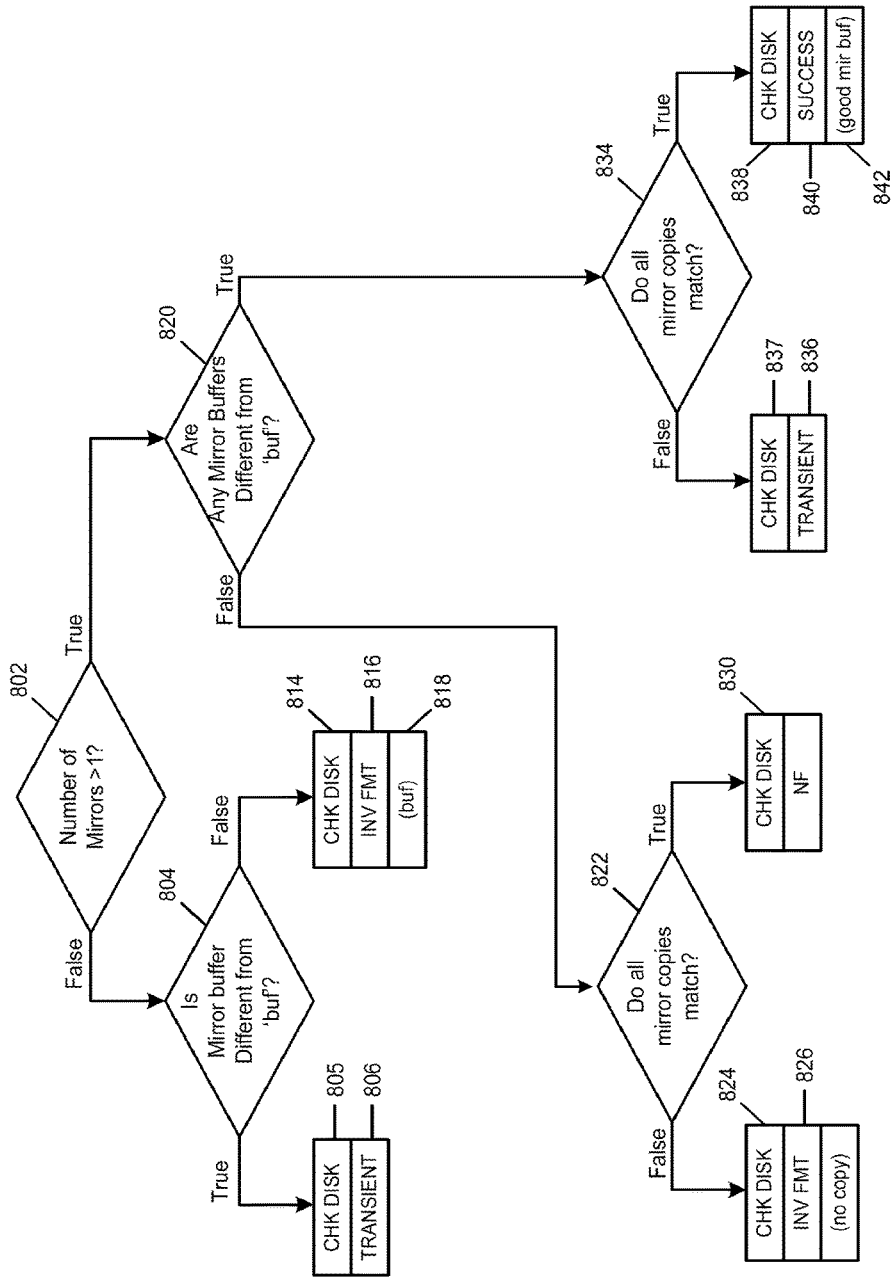
FIG. 8 is a flowchart of operations performed for detection of logical corruption in persistent storage and for automatic recovery therefrom, according to some embodiments.

FIG. 8 is a flowchart of operations performed for detection of logical corruption in persistent storage and for automatic recovery therefrom. As shown, the steps commence at the point of decision 802, which decision is taken based on the existence of at least one mirror site containing the suspected corrupted logical block or blocks that are given in a buffer 'buf'.

TABLE 1

Interpretations of Number of Mirrors

| Number of Mirror Sites | Possible Interpretation |
| --- | --- |
| None | The suspected corrupted logical block or blocks may be the only copy of the block in the system. |
| One | The suspected corrupted logical block or blocks may exist in uncorrupted form in the one mirror. Services to check the disk for consistency (e.g., CHK DISK) should be called to resolve discrepancies. |
| More than One | The suspected corrupted logical block or blocks may exist in uncorrupted form in more than one mirror site. Additional logic can determine the availability of uncorrupted data. |

The representations in FIG. 8 include an ACTION (e.g., check disk, CHK DISK 814), a return status (e.g., invalid format, INV FMT 816), and possibly a return value (e.g., a buffer of data, e.g., (buf) 818, or e.g., null).

Continuing the discussion of the results of decision 802, if it is found that there is not more than one mirror site, then steps and decisions are taken to determine if the data from the mirror and the data from the suspected corrupted block or blocks match (see decision 804). In some cases there is such a single mirror location and the data retrieved from the single mirror location is the same logical data as the suspected corrupted data. When the suspected corrupted data and the mirror site data are logically different, then the event is deemed to be a TRANSIENT and the return status TRANSIENT is returned to the caller (see return value 806). The caller is advised to perform CHK DISK actions (see ACTION 805). To the contrary, when the suspected corrupted data and the mirror site data are deemed as the same or at least not logically different, then the event precipitates a CHK DISK action (see ACTION 814) and the caller is advised that the suspected corrupted block has been subjected to a second test, confirming that the block should be regarded as a suspected corrupted block (see return status 816). The suspected corrupted data is returned to the caller (see return value (buf) 818), and the caller determines further next steps to take.

In another situation, the decision 802 is evaluated and taken to mean there does exist more than one mirror site containing the suspected corrupted block (see the True branch of decision 802). In such a case, the logical block or blocks from the multiple mirror sites are tested for a match (see decision 820). If any of the logical block or blocks from the multiple mirror sites are different from the passed-in buffer (e.g., a suspected corrupted block), then there are some situations where a logical block or blocks from the multiple mirror site can be used to restore the suspected corrupted block or blocks (see True branch of decision 820). Table 2 has several interpretations of mirror matches.

TABLE 2

Interpretations of Mirror Matches

| Status of Match of Mirror Sites Against Suspected Corrupted Block | Possible Interpretation |
| --- | --- |
| The data from the mirror sites have at least one discrepancy, but at least one mirror site is the same as the passed-in buffer. | The suspected corrupted logical block or blocks also exists in suspected corrupted form in at least one mirror. Services to check the disk for consistency (e.g. CHK DISK) should be called to resolve discrepancies. |
| The data from the mirror sites have at least one discrepancy, but at least one mirror site might contain the uncorrupted data. | The suspected corrupted logical block or blocks might exist in uncorrupted form in at least one mirror. Services to check the disk for consistency (e.g. CHK DISK) should be called to resolve discrepancies. The status could be transient. |
| All mirror sites match each other, and are the same as the passed-in buffer | The suspected corrupted logical block or blocks might not be actually corrupted. Or, the suspected corrupted logical block or blocks have already been written to all mirrors. |
| All mirror sites match each other, and are different as the passed-in buffer | The suspected corrupted logical block or blocks can be restored from any one of the mirrors. |

If the True branch of decision 820 is taken, then processing assumes that at least one mirror site data is uncorrupted data, and decision 834 is taken. If all of the mirror site blocks match, then the matching mirror site data is deemed to be uncorrupted data, the caller is advised of SUCCESS (via a return value 840), and the caller is provided with the uncorrupted data (sec (good mir buf) 842) along with an ACTION indication of CHK DISK 838. If, on the other hand, not all of the mirror site copies match, then the suspected corruption may still persist, but still might be correctable via a CHK DISK operation (see 837). Or, when the False branch of decision 834 is taken, the situation might be transient (see 836), and would be corrected in due time as a result of a pending or in-process write (of uncorrupted data) to a mirror.

Returning to decision 820, specifically if the False branch of decision 820 is taken, then processing assumes that all the data at the mirror site might be corrupted in the same fashion as the suspected corrupted block or blocks. If all of the mirrors match (see True branch of decision 822) then the application is advised of an ACTION to CHK DISK (see 830). On the other hand, if all of the mirrors do not match (see False branch of decision 822) then the application is advised of an ACTION to CHK DISK (see 824), and the application is advised with a return status of INV FMT (see return status 826).

Figure 9:
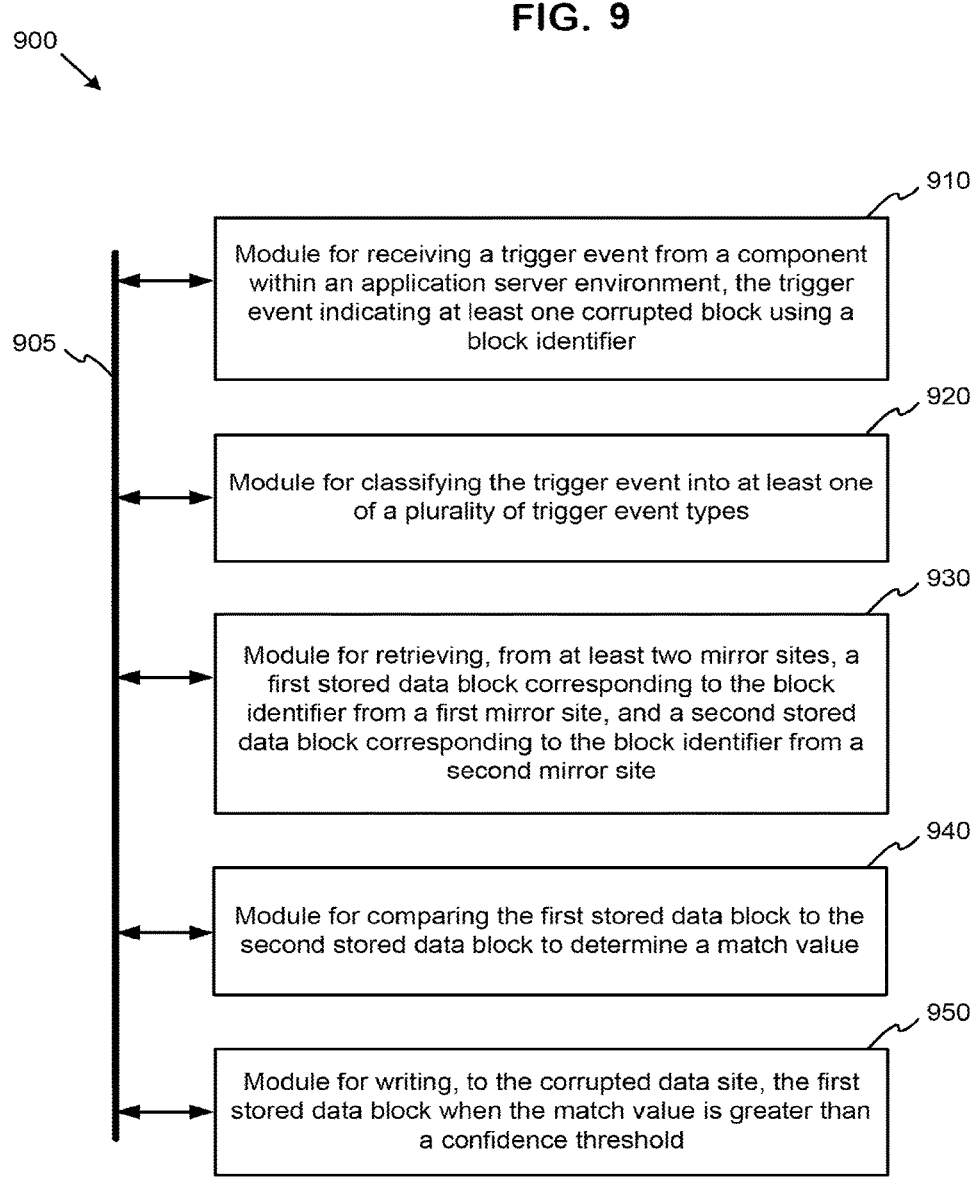
FIG. 9 illustrates a block diagram of an illustrative computing system suitable for implementing an embodiment of the present disclosure, according to some embodiments.

FIG. 9 illustrates a block diagram of a system for restoring a block of data stored at a corrupted data site using two or more mirror sites within a disk group. As an option, the present system 900 may be implemented in the context of the architecture and functionality of the embodiments described herein. Of course, however, the system 900 or any operation therein may be carried out in any desired environment. As shown, system 900 comprises a plurality of modules, a module comprising at least one processor and a memory, each connected to a communications link 905, and any module can communicate with any other modules over communications link 905. The modules of the system can, individually or in combination, perform method steps within system 900. Any method steps performed within system 900 may be performed in any order unless as may be specified in the claims. As shown, system 900 implements a method for restoring a block of data stored at a corrupted data site using two or more mirror sites within a disk group, the system 900 comprising modules for: receiving a trigger event from a component within an application server environment, the trigger event indicating at least one corrupted block using a block identifier (see module 910); classifying the trigger event into at least one of a plurality of trigger event types (see module 920); retrieving, from at least two mirror sites, a first stored data block corresponding to the block identifier from a first mirror site, and a second stored data block corresponding to the block identifier from a second mirror site (see module 930); comparing the first stored data block to the second stored data block to determine a match value (see module 940); and writing, to the corrupted data site, the first stored data block when the match value is greater than a confidence threshold (see module 950).

System Architecture Overview

Figure 10:
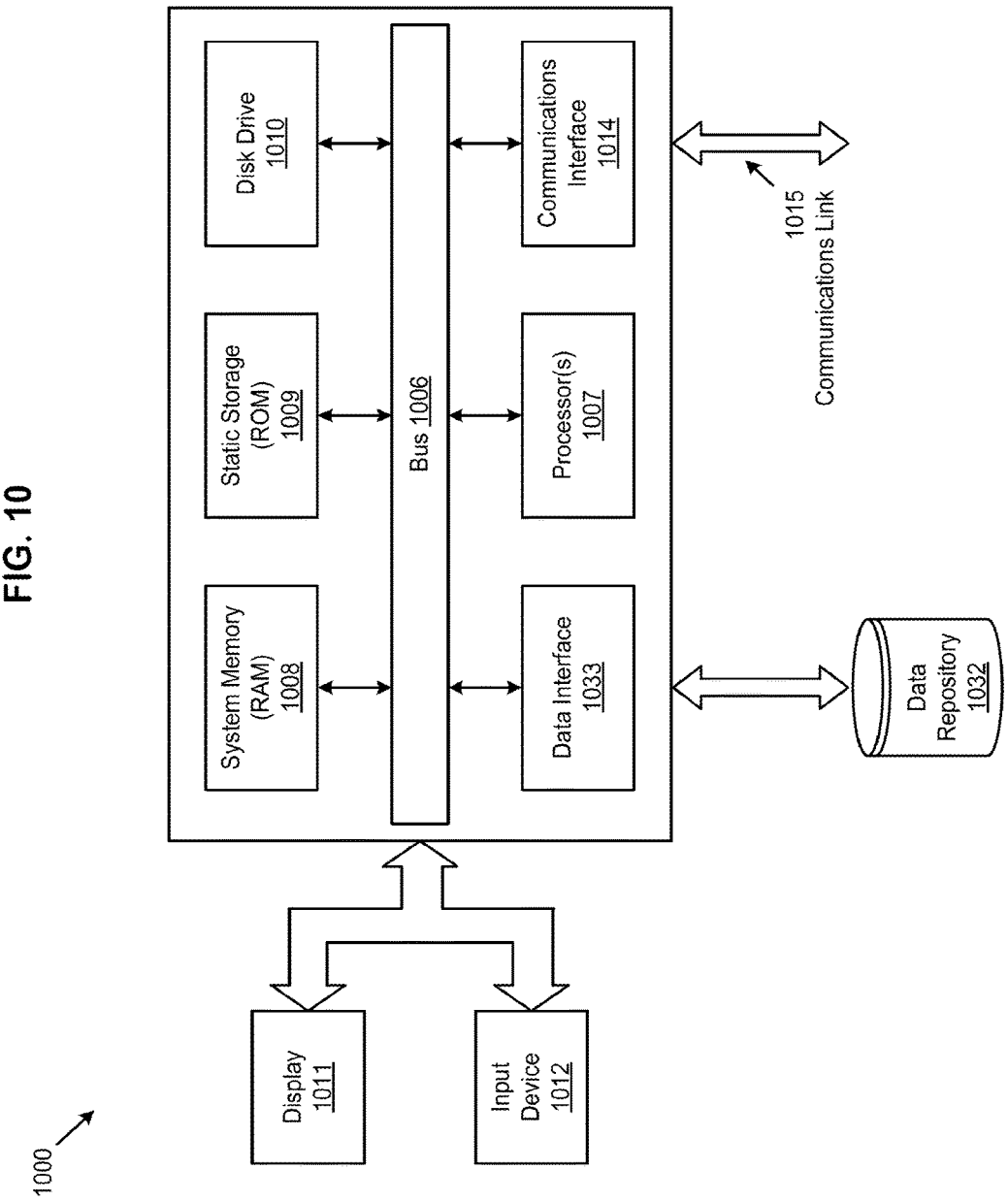
FIG. 10 illustrates a computer system on which an embodiment of the claims can be implemented.

FIG. 10 depicts a block diagram of an instance of a computer system 1000 suitable for implementing an embodiment of the present disclosure. Computer system 1000 includes a bus 1006 or other communication mechanism for communicating information, which interconnects subsystems and devices, such as a processor 1007, a system memory 1008 (e.g., RAM), a static storage device 1009 (e.g., ROM), a disk drive 1010 (e.g., magnetic or optical), a data interface 1033, a communications interface 1014 (e.g., modem or Ethernet card), a display 1011 (e.g., CRT or LCD), input devices 1012 (e.g., keyboard, cursor control), and an external data repository 1032.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device 1009 or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single computer system 1000. According to other embodiments of the disclosure, two or more computer systems 1000 coupled by a communication link 1015 (e.g., LAN, PTSN, or wireless network) may perform the sequence of instructions required to practice the disclosure in coordination with one another.

Computer system 1000 may transmit and receive messages, data, and instructions, including program, i.e., application code, through communication link 1015 and communications interface 1014. Received program code may be executed by processor 1007 as it is received, and/or stored in disk drive 1010 or other non-volatile storage for later execution.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer implemented method for processing data blocks within a disk group, the method comprising:
    identifying components within a computing environment, the components comprising one or more mirror sites;
    receiving, at a server, a trigger event from at least one of the components, the trigger event indicating at least one suspect corrupted block;
    retrieving, from one of the mirror sites, a mirrored copy of the suspect corrupted block;
    comparing the mirrored copy to the at least one suspect corrupted block to determine a match value; and
    invoking a check disk operation based on a confidence threshold corresponding to the match value determined by comparison between the suspect corrupted block and the mirrored copy.

2. The method of claim 1, wherein the check disk operation is a logical consistency check performed on at least a portion of blocks in physical proximity to the suspect corrupted block.

3. The method of claim 2, wherein performing the logical consistency check comprises performing one or more scan passes to identify additional physical or logical corruptions.

4. The method of claim 2, wherein performing the logical consistency check comprises marking a block to signal subsequent online operations to explicitly resynchronize the marked block.

5. The method of claim 1, wherein the check disk operation is a logical consistency check performed on at least a portion of blocks in logical proximity to the suspect corrupted block.

6. The method of claim 5, wherein performing the logical consistency check comprises performing one or more scan passes to identify additional physical or logical corruptions.

7. The method of claim 5, wherein performing the logical consistency check comprises marking a block to signal subsequent online operations to explicitly resynchronize the marked block.

8. The method of claim 1, wherein the trigger event is raised by an application server.

9. The method of claim 1, wherein the trigger event is raised by a volume manager server.

10. The method of claim 1, wherein the check disk operation is a logical consistency check performed on at least a portion of blocks in physical proximity to the mirrored copy.

11. A computer readable medium, embodied in a non-transitory storage medium, the non-transitory storage medium having stored thereon a sequence of instructions which, when stored in memory and executed by a processor causes the processor to perform a set of acts for processing data blocks within a disk group, the acts comprising:
    identifying components within a computing environment, the components comprising one or more mirror sites;
    receiving, at a server, a trigger event from at least one of the components, the trigger event indicating at least one suspect corrupted block;
    retrieving, from one of the mirror sites, a mirrored copy of the suspect corrupted block;
    comparing the mirrored copy to the at least one suspect corrupted block to determine a match value; and
    invoking a check disk operation based on a confidence threshold corresponding to the match value determined by comparison between the suspect corrupted block and the mirrored copy.

12. The computer readable medium of claim 11, wherein the check disk operation is a logical consistency check performed on at least a portion of blocks in physical proximity to the suspect corrupted block.

13. The computer readable medium of claim 12, wherein performing the logical consistency check comprises performing one or more scan passes to identify additional physical or logical corruptions.

14. The computer readable medium of claim 12, wherein performing the logical consistency check comprises marking a block to signal subsequent online operations to explicitly resynchronize the marked block.

15. The computer readable medium of claim 11, wherein the check disk operation is a logical consistency check performed on at least a portion of blocks in logical proximity to the suspect corrupted block.

16. The computer readable medium of claim 15, wherein performing the logical consistency check comprises performing one or more scan passes to identify additional physical or logical corruptions.

17. The computer readable medium of claim 15, wherein performing the logical consistency check comprises marking a block to signal subsequent online operations to explicitly resynchronize the marked block.

18. The computer readable medium of claim 11, wherein the trigger event is raised by a volume manager server.

19. A computer system for processing data blocks within a disk group, the computer system comprising:

a set of components within a computing environment, the components comprising one or more mirror sites;

a server to receive a trigger event from at least one of the components, the trigger event indicating at least one suspect corrupted block and to retrieve, from one of the mirror sites, a mirrored copy of the suspect corrupted block; and a storage subsystem to compare the mirrored copy to the at least one suspect corrupted block to determine a match value and to invoke a check disk operation based on a confidence threshold corresponding to the match value determined by comparison between the suspect corrupted block and the mirrored copy.

20. The computer system of claim 19, wherein the check disk operation is a logical consistency check performed on at least a portion of blocks in physical proximity to the suspect corrupted block.

\* \* \* \* \*

UNITED STATES PATENT AND TRADEMARK OFFICE
CERTIFICATE OF CORRECTION

PATENT NO. : 9,892,756 B2
APPLICATION NO. : 14/886602
DATED : February 13, 2018
INVENTOR(S) : Joshi et al.

It is certified that error appears in the above-identified patent and that said Letters Patent is hereby corrected as shown below:

In the Specification

In Column 6, Line 40, delete "$158_3$," and insert -- $158_3$. --, therefor.

In Column 10, Line 8, delete "$305_0$," and insert -- $305_0$), --, therefor.

In Column 11, Line 3, delete "are take" and insert -- are taken --, therefor.

In Column 15, Line 51, delete "(sec" and insert -- (see --, therefor.

In Column 17, Line 19, delete "PTSN," and insert -- PSTN, --, therefor.

Signed and Sealed this
Twenty-eighth Day of August, 2018

Andrei Iancu
*Director of the United States Patent and Trademark Office*